(12) United States Patent
Scherzinger et al.

(10) Patent No.: US 7,149,629 B1
(45) Date of Patent: *Dec. 12, 2006

(54) AINS LAND SURVEYOR SYSTEM WITH REPROCESSING, AINS-LSSRP

(75) Inventors: Bruno Scherzinger, Richmond Hill (CA); Blake Reid, Unionville (CA); Erik Lithopoulos, Stouffville (CA)

(73) Assignee: Applanix Corporation, Inc., Richmond Hills (CA)

( * ) Notice: Subject to any disclaimer, the term of this patent is extended or adjusted under 35 U.S.C. 154(b) by 89 days.

This patent is subject to a terminal disclaimer.

(21) Appl. No.: 10/959,249

(22) Filed: Oct. 5, 2004

Related U.S. Application Data

(63) Continuation of application No. 09/992,844, filed on Nov. 14, 2001, now Pat. No. 6,834,234.

(60) Provisional application No. 60/252,862, filed on Nov. 22, 2000.

(51) Int. Cl.
*G01V 3/38* (2006.01)
*G01C 21/26* (2006.01)

(52) U.S. Cl. .......................................... 702/5; 701/217
(58) Field of Classification Search ................ 702/5, 702/150; 701/200, 201, 207, 213, 214, 217, 701/220
See application file for complete search history.

(56) References Cited

U.S. PATENT DOCUMENTS

| | | | | |
|---|---|---|---|---|
| 4,060,718 A | * | 11/1977 | Huddle | ........................... 702/2 |
| 5,923,286 A | * | 7/1999 | Divakaruni | ............ 342/357.06 |
| 5,956,660 A | * | 9/1999 | Neumann | .................... 702/150 |
| 6,480,148 B1 | * | 11/2002 | Wilson et al. | ......... 342/357.08 |
| 6,522,266 B1 | * | 2/2003 | Soehren et al. | ............. 340/988 |
| 6,526,352 B1 | * | 2/2003 | Breed et al. | ................ 701/213 |
| 6,594,617 B1 | * | 7/2003 | Scherzinger | ................ 702/160 |
| 6,834,234 B1 | * | 12/2004 | Scherzinger et al. | ........... 702/5 |
| 2003/0135327 A1 | * | 7/2003 | Levin et al. | ................ 701/220 |

OTHER PUBLICATIONS

He et al., Development of a Low-Cost Integrated GPS/IMU System, Dec. 1998, IEEE AES Systems Magazine, pp. 7-10.*

* cited by examiner

*Primary Examiner*—Bryan Bui
*Assistant Examiner*—Toan M. Le
(74) *Attorney, Agent, or Firm*—James F. Kirk

(57) ABSTRACT

A Land Surveyor System with Reprocessing is carried by a surveyor moving from a first known position at the start of a survey interval to a second known position at the end of the survey interval has an AINS (aided inertial navigation system) that provides a continuing sequence of time-indexed present position values. A Position Computing System uses a program that stores the sequence of time-indexed present position values in a memory. A reprocessing computer and program is activated at the second known position to access and process the continuing sequence of time-indexed present position values with a smoothing program to provide indexed and adjusted present position values for at least some of the time-indexed present position values. The system is packaged for transport and use by a surveyor. A switch permits the surveyor to signal that the unit is stationary as a reset for the AINS.

24 Claims, 8 Drawing Sheets

AINS LAND SURVEYOR SYSTEM WITH REPROCESSING, AINS-LSSRP

This Continuation Application claims priority from U.S. provisional application Ser. No. 60/252,862 filed Nov. 22, 2000, and from Non-provisional application Ser. No. 09/992,844 filed Nov. 14, 2001 which later issued as U.S. Pat. No. 6,834,234 B2 on Dec. 21, 2004.

FIELD OF THE INVENTION

The subject invention relates to inertial navigation, and more particularly to aided inertial navigation systems (AINS) based Land Surveyor Systems which use an AINS as a navigational reference and which make it possible to survey forested areas where GPS signals may be missing for long intervals of time or indefinitely due to foliage and or a dense tree canopy. Land surveyor systems that are not aided with a radio positioning system such as GPS as a result of signal blockage due to a tree canopy tend to accumulate position error linearly as a function of time.

BACKGROUND OF THE INVENTION

AINS technology originated in the late 1960's and found application on military navigation systems. An example or the many books on the subject is the text by George Siouris, titled "Aerospace Avionics Systems, A Modern Synthesis", published by Academic Press, published in 1993.

Traditional methods of surveying used laser theodolites, which required access to lines of sight between positions to be surveyed. A line of sight is not always available in forested areas. A line of sight was typically obtained in the past by bulldozing corridors 3–4 meters wide through the forest along the lines or paths to be surveyed. Governments discourage this wasteful and environmentally destructive practice by imposing stumpage fees on destroyed trees and other forms of penalties for environmental damage. The advent of a precise GPS has provided an alternative method of land surveying; however, a Land Survey System based exclusively on a precise GPS receiver is limited to areas where the sky is visible. Some tropical rain forests have canopies that are so dense that precise GPS cannot be used at all.

AINS Land Surveyor

An AINS land surveyor does not require access to the sky and can be operated under a dense tree canopy. A single surveyor using an INS land surveyor can map a forest or jungle area by walking a path among the trees thereby avoiding the need to cut trees to establish a survey lane as would be required using theodolites or a precise GPS. Use of an AINS land surveyor therefore results in reduced cost, and the environmental impact of the survey is substantially reduced.

To reduce drift and obtain acceptable accuracy, the surveyor using an AINS-based land surveyor systems brings the INS to a complete rest about every 1–2 minutes for a period of 5–30 seconds. This is called a zero-velocity update (ZUPD). A Kalman filter uses each ZUPD to zero the INS velocity error and partially calibrate out inertial sensor errors. The position error drift with periodic ZUPD's is on the order of 0.5–2 meters per kilometer, depending on the quality of the inertial sensors and on the frequency of ZUPD's. The requirement for ZUPD's is often an inconvenience, since it limits the surveyor's production.

The Kalman filter in an AINS based Land Surveyor System is also coupled to receive measurement inputs from one or more external and independent sources which are processed to further refine or aid the navigation solution. Aiding information can include aiding signals from sources such as a precise GPS receiver, a Doppler Radar, or from an odometer or a precise pedometer. In the survey of an area permitting an unobstructed view of the sky, a precise GPS provides the simplest aiding signal. Several different accuracy levels are associated with GPS performance and signals. C/A GPS implies uncorrected GPS, and provided 10–20 meter 3D position accuracy. A GPS can be coupled via a radio modem link to a base GPS receiver, which has a precisely known position. The base GPS measures the errors in the signals being received and forwards corrections via the model to the precise GPS aboard the navigator. An RTCM-corrected differential GPS uses industry standard RTCM differential corrections from a dedicated base receiver or a differential corrections service such as the U.S. Coast Guard or Omnistar to obtain 0.5–1.0 meters position accuracy. Real-time kinematic (RTK) GPS uses differential GPS data from a dedicated base receiver to obtain 0.05–0.1 meters position accuracy.

The invention system allows a surveyor to carry the invention AINS-based Land Surveyor System with Reprocessing along a predetermined path or line and to locate and record the position of stakes that the surveyor positions in accordance with a pre-planned grid of locations. The stakes identify the locations of sensors and explosive charges that are used in a seismic survey. The predetermined path begins and ends at position fix (PF) locations that are precisely known. The invention AINS-based Land Surveyor System with Reprocessing then uses the known PF locations at each end of the path and a smoother algorithm to reprocess the stake locations.

Seismic Exploration

Seismic exploration has as its object, the production of a multi-dimensional map of the geological structure over an area below the ground for the purpose of identifying valuable oil, gas and mineral deposits. A seismic survey uses acoustic interferometry to perform the multi-dimensional subterranean mapping. A geophysicist provides a pre-plot map with grid locations of the desired positions of the noise sources and the geophones over the space to be explored. The noise sources are multiple phased dynamite explosions on a 2-dimensional grid pattern. The sound waves from the charges are reflected by the different geological strata, and received by an array of geophones on a separate 2-dimensional grid connected to recording devices.

The multi-dimensional geological map is generated by post-processing the recorded data. The typical error specification for the position of a noise source or a geophone is one meter horizontal and 0.5 meters vertical.

A backpack-borne AINS based system is made and sold by the assignee of this application, Applanix Corporation, at 85 Leek Cresent, Richmond Hill, Ontario, Canada L4B 3B3. The system is called the Position and Orientation System for Land Survey (POS/LS). In operation, a surveyor walks a survey path or trajectory carrying the POS/LS as a backpack. Such survey trajectories often pass through areas where GPS signals are not available. The POS/LS navigates though such GPS outage areas in a dead-reckoning mode with as little position drift as possible. Typically the surveyor moves from one known position to another, and "ties-down" or "fixes" the POS/LS position at the known positions.

The path followed by a surveyor is typically a zigzag pattern of parallel seismic lines, each 1000–5000 meters long with the stakes positioned every 50–200 meters on the lines. A control survey is sometimes performed to verify the accuracy of the seismic survey. A control survey is formed by a number of short survey paths between known positions with traverse legs being approximately perpendicular to the principal seismic or grid lines. Intersections of the control paths with the seismic lines form the control points. The control point position accuracies should be significantly better than the seismic line position accuracies.

SUMMARY OF THE INVENTION

This invention teaches the use of an optimal smoothing algorithm and a method of reprocessing the data accumulated and stored from an AINS-Land Surveyor System with Reprocessing (AINS-LSSRP) between known position fixes or "tie-downs".

A first embodiment of the AINS-LSSRP comprises an AINS that provides a sequence time-indexed present position values in response to the LSSRP being moved from a first known position value or PF at the start of a survey interval to a second known position value at the end of the survey interval. The LSSRP has a Position and Orientation (POS) Computer Subsystem (PCS) coupled to receive and store the sequence of time-indexed present position values as the surveyor moves from the first known position to the second known position. The PCS has a reprocessing computer and program means for processing the indexed present position values with a smoothing algorithm to provide indexed and adjusted present position values for at least some of the indexed present position values recorded as the LSSRP was moved from and between the first known position value at the start of the survey interval and the second known position value at the end of the survey interval.

In a more particular alternative embodiment, of the LSSRP, the AINS uses a Kalman filter responsive to at least two sources of aiding signals, and the PCS has an aiding signal selector algorithm characterized to select the most accurate aiding signal for use by the Kalman filter from all available aiding signals.

In yet another more particular embodiment of the LSSRP, the AINS uses a reprocessing computer and program means smoothing algorithm that is used is a Modified Bryson-Frazier smoother (MBFS).

DETAILED DESCRIPTION OF THE INVENTION

The invention taught herein improves the accuracy of reported stake positions by combining the benefits of an AINS, such as the AINS used in an Applanix Position and Orientation System for Land Survey (POS/LS) with the steps of onboard data reprocessing. The combination forms an AINS-Land Surveyor System with Reprocessing (AINS-LSSRP) represented by block 42 in FIG. 2. In operation and use, a surveyor begins a survey interval or leg from a position fix (PF) location having a precisely known location. The surveyor initializes the present position of his AINS-LSSRP using differential GPS or a pre-surveyed marker. The surveyor then follows predetermined survey lines or paths that run for several kilometers in accordance with desired grid locations on a map. The surveyor may follow a zigzag pattern where the survey lines go into tree covered areas and where GPS contact is sometimes lost. In some rain forests, such as those in Indonesia, GPS can be lost for an entire day. The surveyor uses the AINS-LSSRP to position stakes at the predetermined grid locations and on reaching a second PF, the surveyor resets or "ties down" the AINS-LSSRP position with the precise position coordinates of the PF. The AINS-LSSRP then launches the reprocessing function, which reprocesses and adjusts data gathered in the course of the traverse between the two PF locations including the recorded positions of the stakes using a smoothing algorithm. The adjusted positions of the stakes are reported as a product of the survey.

Figure 1:
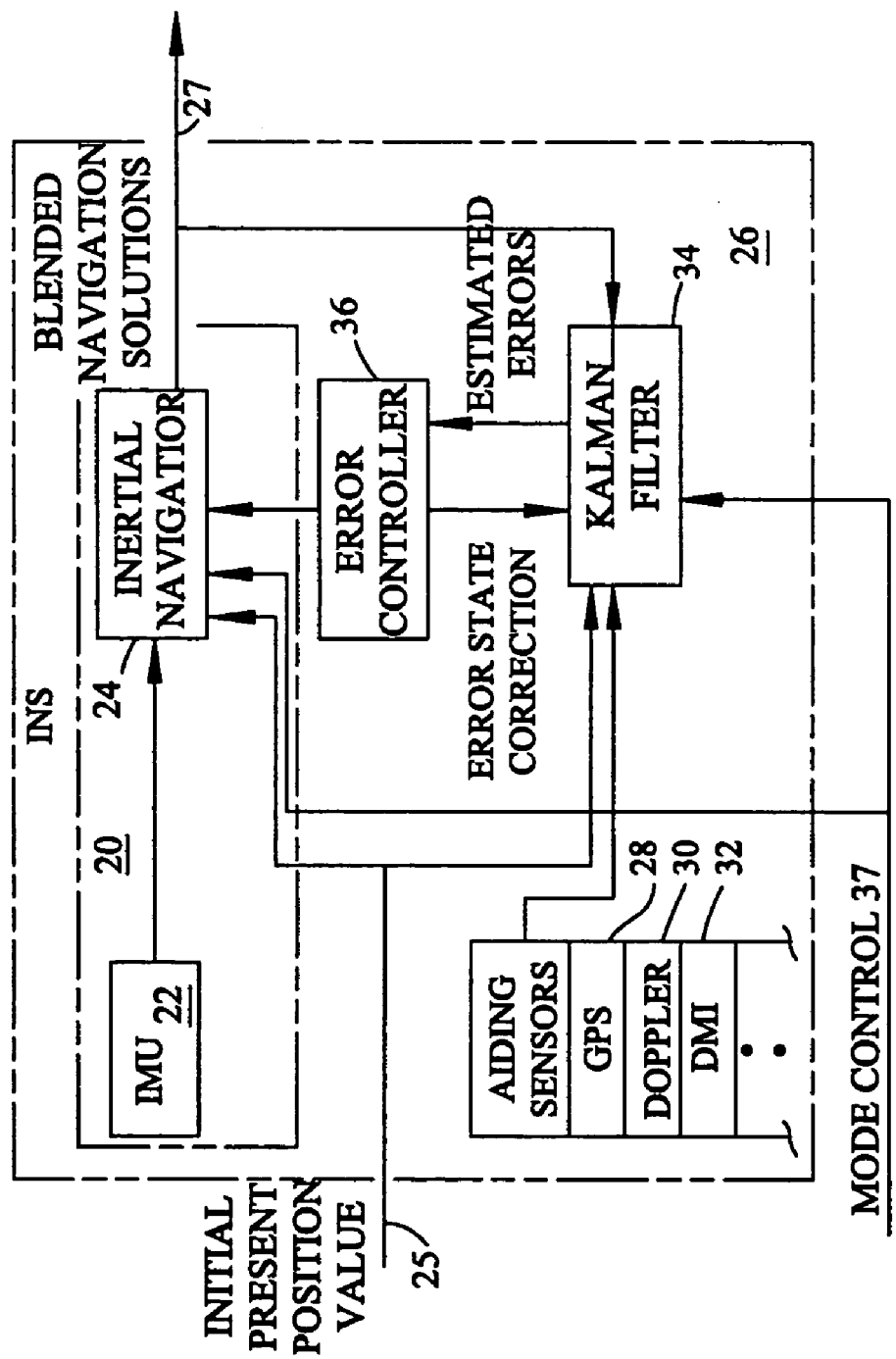
FIG. 1 is a block diagram of an aided INS system.

FIG. 1 shows a generic Aided INS architecture. The elements within phantom box 20 represent an inertial navigation system (INS), having an inertial measurement unit (IMU) 22 and an inertial navigator 24. The inertial navigator is typically mechanized using a digital computer and software for processing signals from and for delivering signals to the IMU 22.

The IMU 22 comprises a triad of accelerometers (not shown) that measure total specific force to restore a proof mass, the force being proportional to acceleration, and a triad of gyros (not shown) that measure total angular rate. The IMU also provides the supporting process and interface electronics (also not shown) that convert and output the inertial acceleration and angular rate signal data in a digital format. The inertial navigator is a mechanization of Newton's equations of motion, in software, typically running on the aforementioned digital computer. To do this, the INS 20 typically aligns or transforms the signal data from its package or vehicle navigation coordinate frame into a fixed and earth referenced coordinate system, such as a North, East and Down directions. In some mechanization's, the horizontal axes is aligned to a heading other than North/East and the heading offset angle is called the wander angle. A typical ground alignment requires the INS to be stationary for 5–15 minutes so that the INS can measure the gravity vector with its accelerometers to establish Down alignment and with a knowledge of the latitude, measure the horizontal component of the earth rotational rate vector with its gyros to establish the North direction and or the wander angle.

An aided inertial navigation system (AINS) 26 typically comprises an INS 20, one or more aiding sensors such as the GPS receivers 28, a Doppler Radar 30 or a distance measuring instrument (DMI). A Kalman filter 34 and a mechanism such as the error controller 35 process corrections to the INS 20.

Notation

The following notation is used in this description of the invention. Lower case letters denote vectors. For example, $\bar{x}$ denotes a vector. Upper case letters denote matrices. For example, H denotes a matrix.

Subscripts on vectors and matrices are used to indicate a discrete sequence number that correspond to a sample time. For example, the matrix $H_k$ denotes that the time of validity of the matrix H is sample time $t_k$, and hence is the k-th sample in a discrete time series of H.

"E" denotes the expectation operator. See A. Papoulis, "Probability, Random Variables and Stochastic Processes", McGraw-Hill, 1965 or any other reference on random variables for its definition.

Kalman Filter

The Kalman filter 34 is a recursive minimum-variance estimation algorithm that computes an estimate of a state vector based on constructed measurements. The measurements typically comprise computed differences between the inertial navigation solution elements and corresponding data elements from the aiding sensors. For example, an inertial-GPS position measurement comprises the differences in the latitudes, longitudes and altitudes respectively computed by the inertial navigator and a GPS receiver. The true positions cancel in the differences, so that the differences in the position errors remain. A Kalman filter designed for integration in an INS with aiding sensors estimates the errors in the INS outputs and aiding sensors. INS errors typically include: inertial North, East and Down position errors; inertial North; East and Down velocity errors; inertial platform misalignment in the local level vector and wander angle errors; accelerometer biases and gyro biases. Aiding sensor errors can include the following: GPS North, East and Down position errors; GPS carrier phase ambiguities and DMI scale factor error.

The Kalman filter therefore performs as an optimal linear minimum variance estimator that operates on a time series of measurements to estimate the state vector of a linear stochastic multivariable model of the form:

$$\bar{x}_{k+1} = \Phi(k+1; k)\bar{x}_k + \bar{\mu}_k$$
$$\bar{z}_k = H_k \bar{x}_k + \bar{\eta}_k \quad (1)$$

where $\bar{x}_k$ is the n-dimensioned state vector at discrete time $t_k$, $\Phi(k+1; k)$ is called the transition matrix, or the n×n system dynamics state transition matrix. It is the discrete version of the system matrix $\Phi$ and is analogous to the F matrix that appears in the text by G. Siouris referenced above.

$\bar{\mu}_k$ is an n-dimensioned vector of process noises with variance $Q_k$ where $$E[\bar{\mu}_k \bar{\mu}_{k+j}^T] = Q_k \delta_j \quad (2)$$

The subscripts k and k+j are sample counts or indices. The samples are valid at discrete times t of k) and t of (k+j). The dependency on time t is dropped and only the sample indices of k and j are retained to identify the discrete samples.

The $\bar{\mu}_k$ symbol is a way of specifying white noise. Equation (2) above represents the expected value of a noise vector at one time multiplied by the noise vector transpose at a subsequent time, the product being equal to the covariance matrix Q times the delta function which basically says that the expected value is non-zero only when the two times are the same. In other words, noise vectors sampled at different times are completely uncorrelated. The arrow above $\mu_k$ indicates that it is an n-dimensional vector of process noises with variance. The process noise is not a known error. Process noise is the driving noise in the stochastic model for the dynamics that the Kalman filter is designed to estimate. The state vector is therefore a vector of random variables whose randomness requires the use of a Kalman filter.

If a process has no noise, then it should be possible to predict every future value of that process based on some initial value. If the first value is known and the system dynamics state transition matrix is $\Phi$ (Phi) that describes how that process proceeds, then in the absence of noise, every future value can be predicted exactly. A Kalman filter is not necessary in such systems.

$\bar{z}_k$ is the m-dimensioned measurement vector at discrete time $t_k$. In operation, it is equal to a position fix at discrete time $t_k$.

$H_k$ is the m×n measurement model matrix, or measurement matrix.

$\bar{\eta}_k$ is the m-dimensioned vector of measurement noises with variance:

$$E[\bar{\eta}_k \bar{\eta}_{k+\tau}^T] = R_k \delta_\tau \quad (3)$$

As above, terms that begin with "E[ ]" imply an expected or average value.

where $\delta_k$ is the discrete delta function given by:

$\delta_k = 1$ when k=0, $\delta_k = 0$ otherwise.

$\Phi(k+1; k)$ describes the transition of the dynamic system from sample k at time $t_k$ to sample k+1 at time $t_{k+1}$. A text by T. Kailath, "Linear Systems", Prentis-Hall, Inc. 19 100 provides a further discussion. Such a model is often used to model the behavior of a noisy multivariable process. A Kalman filter is used to estimate the internal dynamic parameters of the process based on noisy measurements of the process. This is the conventional method of modeling and estimating the errors of an INS system such as that shown in FIG. 1. The Kalman filter is constrained to causal operation, hence its estimate of a state vector is the optimal estimate based on all past and current measurements. The following equations describe the standard Kalman filter:

Extrapolation or Time Update:

Equations 4 and 5 below extrapolate the state vector $\bar{x}_k$ from sample time $t_{k-1}$ to sample time $t_k$. The state vector $\bar{x}_k$ is updated at sample time $t_k$ using measurements valid at time k and again for the next sample time $t_{k+1}$.

$$\bar{x}_k^- = \Phi(k; k-1)\bar{x}_{k-1}^- \quad (4)$$

$$P_k^- = \Phi(k; k-1)P_{k-1}^+ \Phi(k; k-1)^T + Q_{k-1} \quad (5)$$

Equations 4 and 5 show that the transition matrix $\Phi$ transitions the state estimate of the state vector $\bar{x}_k$ from sample k−1 to sample k. The transition matrix $\Phi(k; k-1)$ describes the system dynamics in a discrete setting.

Measurement update:

$$\bar{x}_k^+ = \bar{x}_k^- + K_k \bar{\xi}_k \quad (6)$$

$$\bar{\xi}_k = \bar{z}_k - H_k \bar{x}_k^- \quad (7)$$

$$P_k^+ = (I - K_k H_k) P_k^- \qquad (8)$$

$$K_k = P_k^- H_k^T S_k^{-1} \qquad (9)$$

$$S_k = H_k P_k^- H_k^T + R_k \qquad (10)$$

where $\bar{x}_k^-$ is the priori (before measurement update) estimate of the state vector, $\bar{x}_k^+$ is the posteriori (after measurement update) estimate of the state vector, $\bar{\xi}_k$ is the Equations 4 and 5 innovations vector. The term "innovations" is an established and accepted term in Kalman filtering that describes the difference between the measurement vector $\bar{z}_k$ and the model for the measurement vector $H_k$ before the update is processed.

$P_k^-$ is the priori estimation error variance-covariance (VCV) matrix, $P_k^+$ is the posteriori estimation VCV matrix, $K_k$ is the Kalman gain matrix, $S_k$ is the innovations VCV matrix.

The VCV matrices $P_k^-$, $P_k^+$ and $S_k$ are propagated in parallel with the state vector $\bar{x}_k^{+/-}$ using equations (5) and (8). The discrete system dynamics are defined per equation (1). The VCV matrix is then propagated.

The estimation error VCV matrix describes the Kalman filter's predicted estimation error propagation statistics as follows:

$$P_k^{+/-} \approx E[(\bar{x}_k^{+/-} - \bar{x}_k)(\bar{x}_k^{+/-} - \bar{x}_k)^T] \qquad (11)$$

The diagonal elements of equation (11) are the predicted estimation error variances for the individual state vector elements. If the model of equation (1) exactly describes the system dynamics and measurements, then the estimation error VCV matrix exactly describes the estimation error statistics of equation (11). The model of equation (1) is at best an approximation for a nonlinear system; therefore the estimation error VCV matrix is interpreted for each case.

The minus and plus exponents in the above equations imply values respectively occurring before and after the Kalman filter measurement update at a given time index k. A (−) superscript indicate a before measurement update. A (+) superscript indicates an after measurement update. A (+/−) indicates that the equation holds for either case. This notation is used in a related text titled "Applied Optimal Estimation", MIT Press 1994 (12th printing 19 112) by A. Gelb, (editor).

The theoretical value of the covariance matrix is the expected value of the error vector times the error vector transpose. The product of two parameters is the cross correlation or the autocorrelation between those two values. If they are uncorrelated from one sample to the next then the autocorrelation is zero except at the time when the two samples are valid or at a point where the two samples are taken at the same time. They are equal to the variance if it is a scalar or to the covariance if it is a vector.

At the conclusion of each AINS system navigational solution, a time blended position is the result. If the Kalman filter is designed to interface to a smoother, it writes the following variables to a file which the smoother later reads:

$\Phi(k+1; k)$ transition matrix from k to k+1

$H_k$ measurement matrix at iteration k $K_k$ Kalman gain at iteration k $S_k$ Kalman innovations covariance at iteration k innovations vector at iteration k. See page 317 in Gelb's "Applied Optimal Estimation" text referenced below.

Kalman estimated error state at iteration k

Kalman generated estimation error VCV matrix at iteration k

To implement a Kalman filter, the designer first chooses or codes the parameters $\Phi(k+1; k)$, $Q_k$, $H_k$ and $R_k$ so that the Kalman filter properly models the process being estimated. If the process being estimated is the INS error process, then the parameters $\Phi(k+1; k)$ and $Q_k$ are derived from one of several known INS error models. Error models are discussed in the above referenced text by George Siouris, titled "Aerospace Avionics Systems, A Modern Synthesis", published by Academic Press, published in 1993. The designer then designs the measurements $\bar{z}_k$ that the Kalman filter will process, and from these measurements, the filter computes and implements the measurement model parameters $H_k$ and $R_k$. For a GPS-aided INS, the measurement $\bar{z}_k$ are typically differences between the INS and GPS position and velocity data. $H_k$ describes the measurement geometry with respect to the state vector $\bar{x}_k$, and $R_k$ describes the measurement noise variance or relative weighting of each scalar measurement in the measurement vector $\bar{z}_k$. The steps in Kalman filter design are discussed in several texts, one of which is mentioned above, i.e., the text by A. Gelb titled "Applied Optimal Estimation", MIT Press 1994 (12th printing 19 112) by, (editor).

Equations 4 through 10 above describe the full mechanization of the Kalman filter, given the above model parameters and measurements. There are also several references on numerically stable and efficient implementations of these equations. A popular implementation is that disclosed as the Bierman implementation described in the text titled "Factorization Methods For Discrete Sequential Estimation" by G. J. Bierman and published by Academic Press in 1977.

Optimal Smoothing Algorithms and Methods

A smoothing algorithm is defined here to be any algorithm that computes an estimate of a quantity or collection of quantities assembled into a vector at a given estimation time using measured data having times of validity before and after the estimation time.

An optimal fixed interval smoother computes the optimal estimate based on all past, current and some future measurements. It is characterized in the text by A. Gelb, referenced above, as a variance weighted-weighted combination of a Kalman filter running forward in time on a data time series and a Kalman filter running backward in time on the same data time series. The fixed interval smoother operates on all available measurements to compute the optimal estimate at each sample time based on all measurements during a defined process interval.

Different smoother formulations can be obtained by the algebraic manipulation of the basic forward-backward Kalman filter smoother. The following equations describe one such formulation that is developed further in the text title "Applied Optimal Control" by A. E. Bryson Jr. and Y. C. Ho, published by Wiley and Sons, 1975. The smoother is referred to as the modified Bryson-Frazier smoother (MBFS).

Backwards extrapolation:

$$\bar{\lambda}_{k-1}^+ = \Phi^T(k; k-1) \bar{\lambda}_k^- \qquad (12)$$

$$\Lambda_{k-1}^+ = \Phi^T(k; k-1) \Lambda_k^- \Phi(k; k-1) \qquad (13)$$

Adjoint measurement update:

$$\bar{\lambda}_k^- = (I - H_k K_k) \bar{\lambda}_k^+ - H_k S_k^{-1} \bar{\xi}_k \qquad (14)$$

$$\Lambda_k^- = (I - H_k K_k)^T \Lambda_k^+ (I - H_k K_k) + H_k^T S_k H_k \qquad (15)$$

where:
  $\bar{\lambda}_k^-$ is the a priori adjoint state vector,
  $\Lambda_k^-$ is the a priori adjoint VCV matrix,
  $\bar{\lambda}_k^+$ is the a posteriori adjoint state vector, and
  $\Lambda_k^+$ is the a posteriori adjoint VCV matrix.

The input data to the MBFS at the k-th iteration of the MBFS comprises the following data items that a Kalman filter designed for interface to a MBFS computes internally and writes to data files:

$\Phi$(k; k−1) transition matrix from iteration k−1 to iteration k $H_k$ measurement matrix at iteration k $K_k$ Kalman gain at iteration k $S_k$ Kalman innovations covariance at iteration k $\xi_k$ innovations vector at iteration k. See page 317 in Gelb's "Applied Optimal Estimation" text referenced above.

$\bar{x}_k^+$ Kalman estimated error state at iteration k $P_{kk}^+$ Kalman generated estimation error VCV matrix at iteration k The smoothed state and estimation error VCV matrix are obtained as follows:

$$\bar{x}_k^s = \bar{x}_k^- - P_k^- \bar{\lambda}_k^- = \bar{x}_k^+ - P_k^+ \bar{\lambda}_k^+ \tag{16}$$

$$P_k^s = P_k^-(I - \Lambda_k^- P_k^-) = P_k^+(I - \Lambda_k^+ P_k^+) \tag{17}$$

Note that smoothing with the a priori or a posteriori states and VCV matrices yields the same smoothed state and VCV matrix. This is the mathematical expression of the fact that the smoothed estimate at any estimation time is the optimal estimate based on all measurements, before and after the estimation time.

Application of Optimal Smoothing to the AINS-LSSRP

A smoother designed for an AINS-LSSRP comprises two components: the smoothed estimation operation and the position solution correction operation. The smoothed estimation operation uses the MBFS described previously that is made specific to the AINS component of the AINS-LSSRP primarily through the design of the stochastic state and measurement models in Equation 1. The Kalman filter is designed to estimate the errors in the INS and siding sensors. This is a well-understood practice among navigation practitioners, and is described in G. Siouris referenced above and reviewed here briefly.

The elements of the state vector $\bar{x}_k$ in Equation 1 comprise the INS navigation errors (position, velocity and attitude errors), inertial sensor errors (accelerometer and gyro biases and possibly other errors) and aiding sensor errors. The AINS-LSSRP requires an improved position solution only, hence the state vector is given the following representation:

$$\bar{x}_k = \begin{bmatrix} \delta \bar{r} \\ \bar{x}_{remaining} \end{bmatrix} \tag{18}$$

where
  $\delta \bar{r}$ is the AINS position error
  $\bar{x}_{remaining}$ is the sub-vector of error states other than $\delta \bar{r}$ The elements of the measurement vector $\bar{z}_k$ in Equation 1 comprise differences between the positions and velocities computed by the INS and corresponding positions and velocities from the aiding sensors. The Kalman filter thus compares components of the INS navigation solution with corresponding components from the aiding sensors, and thereby estimates the errors in the INS navigation solution and the aiding sensors.

The AINS then corrects the INS navigation algorithm with the estimated INS navigation errors. The closed-loop between the INS and the AINS Kalman filter shown in FIG. 1 achieves regulation of the INS errors to consistency with the aiding sensor errors. If the adding sensors include a GPS receiver, then the AINS navigation errors will be consistent with the GPS navigation errors. In particular, AINS error regulation suppresses the INS position error drift, and the Kalman filter estimates and thereby calibrates the inertial sensor errors such as the accelerometer and gyro biases. By using a Kalman filter to estimate the INS errors, the AINS achieves a theoretically optimal (in the least-squares sense) navigation error based on all past and current aiding sensor data.

The MBFS described in Equations 12 to 15 operates on data generated by the AINS Kalman filter and written to data files, and computes a smoothed error state and VCV described in Equations 16 and 17 that have improved accuracy over the estimated error state from the AINS Kalman filter. The improvement results from the fact that the MBFS computes the optimal estimate (in the least-squares sense) at an iteration k based on all aiding sensor data before and after the iteration k. The MBFS thus computes estimates of the INS position, velocity and attitude errors, called the smoothed INS errors, that the AINS error regulation mechanism was unable to correct because of the causal constraint on access to aiding sensor data. The smoothed error state is partitioned as follows compatible with Equation 18.

$$\bar{x}_k^s = \begin{bmatrix} \delta \bar{r}_s \\ \bar{x}_{remaining}^s \end{bmatrix} \tag{19}$$

where
  $\delta \bar{r}_s$ is the smoothed estimate of AINS position error
  $\bar{x}_{remaining}^s$ is the sub-vector of smoothed error states other then $\delta \bar{r}_s$ The position solution correction operation corrects the AINS position solution by simple subtraction of the smoothed AINS position errors from the AINS position solution. The actual mechanization depends on the AINS position coordinate format, which can be one selected from the following possible formats: geographic (latitude, longitude, altitude), Universal Transverse Mercatur (UTM) (Northing, Easting, height) or earth-fixed Cartesian (X, Y, Z components of position vector $\bar{r}_k^e$). The following example corrects an earth-fixed Cartesian position vector $\bar{r}_k^e$ to obtain the corrected or reprocessed position vector $\bar{r}_{s_k}^e$.

$$\bar{r}_{s_k}^e = \bar{r}_k^e - \delta \bar{r}_s = \begin{bmatrix} \hat{r}_x^e - \delta \hat{r}_{s_x}^e \\ \hat{r}_y^e - \delta \hat{r}_{s_y}^e \\ \hat{r}_z^e - \delta \hat{r}_{s_z}^e \end{bmatrix} \tag{20}$$

Zero-Velocity Update (ZUPD)

Figure 2:
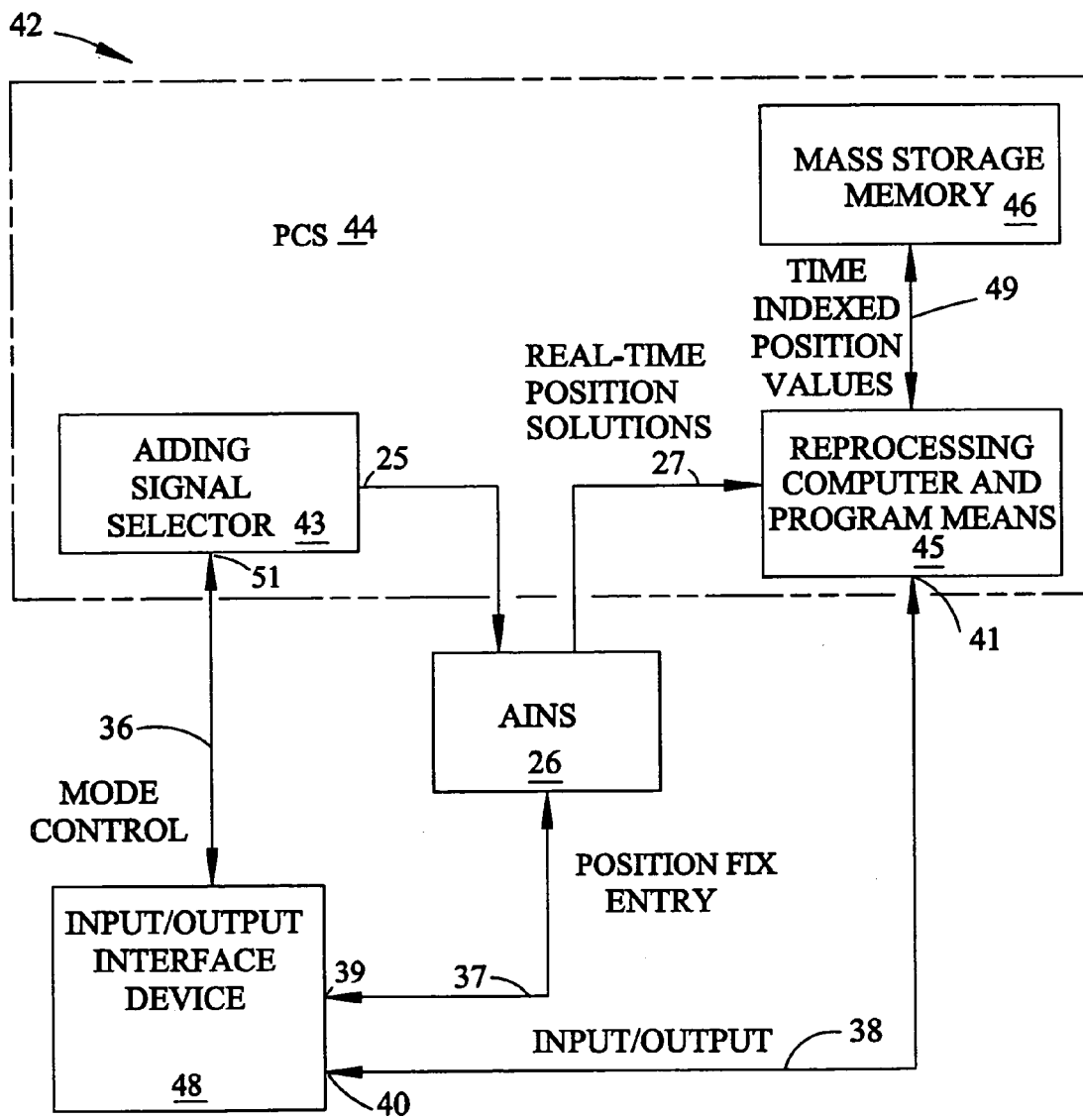
FIG. 2 is a block diagram of the Aided Inertial Navigation System-Land Surveyor System with Reprocessing (AINS-LSSRP)

The AINS-LSSRP represented by block 42 in FIG. 2 is brought to a complete rest periodically, typically every 1–2 minutes, for a period of 5–30 seconds. Each rest period is called a zero-velocity update (ZUPD). A Kalman integration filter uses these zero velocity observations to zero the INS velocity error and to null inertial sensor rate errors. An AINS-LSSRP (Land Surveyor System with Reprocessing) can reduce position error drift with periodic ZUPD's to a value of 0.5–2 meters per kilometer depending on the quality of the inertial sensors and the time between ZUPD's. However, the requirement for ZUPD's limits the surveyor's production.

Figure 3:
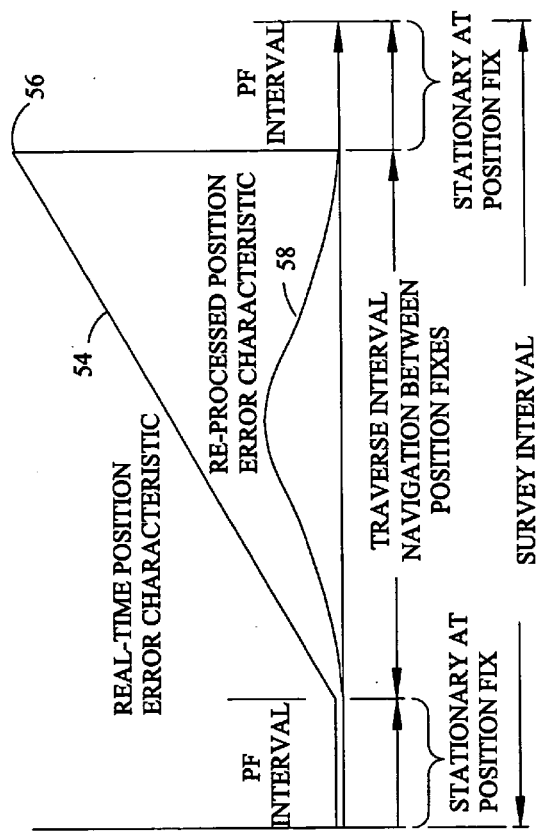
FIG. 3 is a schematic characterization showing a top graph of real-time position error growing linearly with time; a lower graph shows reprocessed position solutions with a maximum average error at a location approximately between position fixes.

Referring to FIG. 3, survey lines are called traverses. The surveyor starts each traverse interval from a known position, referred to in FIG. 3 as a PF interval, an indexed position fix at a mapped survey grid location. The surveyor then follows the survey lines while positioning stakes at required map grid locations. The surveyor continues along the traverse and tries to end up at another known position and does a "tie down" where he establishes the next PF or position fix. "Tying down" means that the surveyor arrives at the second known position and enters the known coordinates of the position fix into this navigation system. The position error that has accumulated over the traverse is reset to zero.

The reprocessing feature of the invention activates the processor's smoother algorithm at each "tie-down". Reprocessing enables the system to use the recently stored data to calculate the errors and to correct the position of stakes located in the course of the traverse interval between position fixes. Having corrected the locations of the stakes for a completed traverse, the system is free to retain or delete the previously stored time-indexed position values if memory constraints require the storage space used for the previously stored time-indexed position values be made available for use in the course of the next survey interval.

The time indexed solutions are position values that the AINS computes and logs in a mass memory unit as the surveyor is traversing a survey line between position fixes. As a tie down location is reached, the operator pushes a button or otherwise initiates the reprocessing function. In the alternative, the operator could transfer the known position values for the tie down as a pre-recorded waypoint, push the button and keep going. The computer can navigate with time navigation on a second traverse while running the smoother on the recorded positions from a first traverse.

As the smoothing algorithm completes the smoothing process, it outputs a smoothed error table and surveyed positions with improved accuracy for the data gathered in the previous traverse. The smoothed error table is a close estimate of the position error for each time position in the previous traverse. Curve 58 in FIG. 3 schematically depicts the re-processed position error from a completed survey interval.

FIG. 2 is a block diagram of an embodiment of the invention AINS-LSSRP 42 that uses a generic smoothing algorithm to re-process the aided inertial navigation data. The AINS-LSSRP 42 comprises an AINS 26 with aiding signal sources therein as shown in FIG. 1, a processing computer called the POS computer subsystem (PCS) 44 comprising a STORAGE DEVICE 46, a reprocessing computer and program means 45, and an aiding signal selector 43. Input/output interface device is coupled to the PCS 44 and allows the survey to input data into the AINS 26, reprocessing computer and program means 45 and aiding signal selector 43 as required.

Input/output interface device 48 is typically a keyboard and/or a display, with which the operator uses to initiate reprocessing at a known tie-down or position fix. The interface device has a mode control bus 36 coupled to the aiding signal selector input 51, a position fix entry bus 37 coupled to the AINS 26 from output 39 and an input/output bus 38 coupled from output port 40 to the reprocessing computer and program means input 41. The mode control bus 36 and the input/output bus 38 provide input and output control signals and position values and smoothed position values as required between the respective functional blocks for control, display and data transfer purposes.

The AINS 26 provides a series of real-time position values via bus 27 to the reprocessing computer and program means 45 for transfer and storage in arrays of memory locations in mass storage memory 46 via data bus 49. The time-indexed position values are output during each traverse between "tie-downs" via bus 27 to the reprocessing computer and program means block 45 and via data bus 49 to mass storage memory 46.

The reprocessing computer and program means 45 reprocesses and filters each set of time-indexed position values. The aiding signal selector 43 is programmed or controlled by an input from the surveyor via the input/output interface device 48 via bus 36 to direct the AINS 26 to select the most accurate of the aiding signals available, such as a precise GPS aiding position signal. Input/output interface device 48 receives position values (PF values) from the surveyor and transfers the values to the AINS 26 and to the reprocessing computer and program means 45. The reprocessing computer and program means 45 is programmed with the algorithm that mechanizes a smoother filter such as the filter characterized by equations 12 through 17 above.

The aiding signal selector 43 is typically a computer program, a sequential machine or software program, or an operator-controlled software switch that selects the highest accuracy time-indexed aiding position values available and couples the selected aiding signal values to the AINS 26 or directs the AINS 26 as to which signal source to select. By way of example, if the radio modem drops out, the GPS position accuracy can drop from 0.05 meters to 20 meters. If the AINS-LSSRP has maintained a position accuracy of better than a few meters, the aiding signal selector would direct the AINS to treat a radio modem link loss as a complete GPS outage. Alternatively the operator may be suspicious of GPS accuracy and would then manually deselect GPS data processing by the AINS.

The AINS-LSSRP will not use C/A quality GPS data because it can achieve better position accuracy between two position fixes using ZUPD aiding alone. In this mode, the AINS-LSSRP navigates as if GPS data is not available in the absence of a radio modem link. Re-processing is important in this case even though the receiver has clear access to GPS C/A quality signals from the GPS satellites. Since the radio modem can be lost, without notice, at any time, ZUPD's continue to be necessary for improved accuracy.

FIG. 2 shows that aiding signal selector is coupled to AINS 26 via signal path 25. It should be understood that all data might be coupled between the all of the blocks shown via a common bus connecting the functions characterized in FIG. 2. The reprocessing computer and program means 45 reads the set of time-indexed position values and smoother values from the Kalman filter in AINS 26 and uses the start position fix or tie-down and end position fix or tie-down and all of the time-indexed position values from the previous related traverse to calculate an estimated error for each time-indexed position value or PF for each traverse. The error is then applied to correct each corresponding time-indexed position value to provide a set of corrected or adjusted time-indexed position fixes. Each filtered time-indexed position fix has an accuracy that is improved over the accuracy of the corresponding time-indexed position value fix.

In a more particular embodiment of the AINS-LSSRP 42, the reprocessing computer and program means 45 for reprocessing and filtering a set of time-indexed position values is programmed to be a smoother such as a Modified Bryson-Frazier Smoother (MBFS) that operates on all available measurement values to compute optimal estimates of position values based on all measurements during a defined processing interval or traverse. The MBFS operates on a set of time-indexed position values for each traverse using the start PF and the end PF values with the position values benefiting from all ZUPD's between the start and end position fixes.

FIG. 3 schematically shows that the real-time position error, top curve 54 increases linearly with time and reaches a maximum at peak 56 on the last position solution before the AINS Kalman filter processes the next position fix. By contrast, curve 58 shows that the reprocessed position solution exhibits a maximum average error approximately midway between position fixes. A survey interval therefore comprises a PF interval plus a subsequent traverse interval plus the next PF interval. A survey interval thus begins with the start of a PF interval and ends with the end of the subsequent PF interval.

Figure 4A:
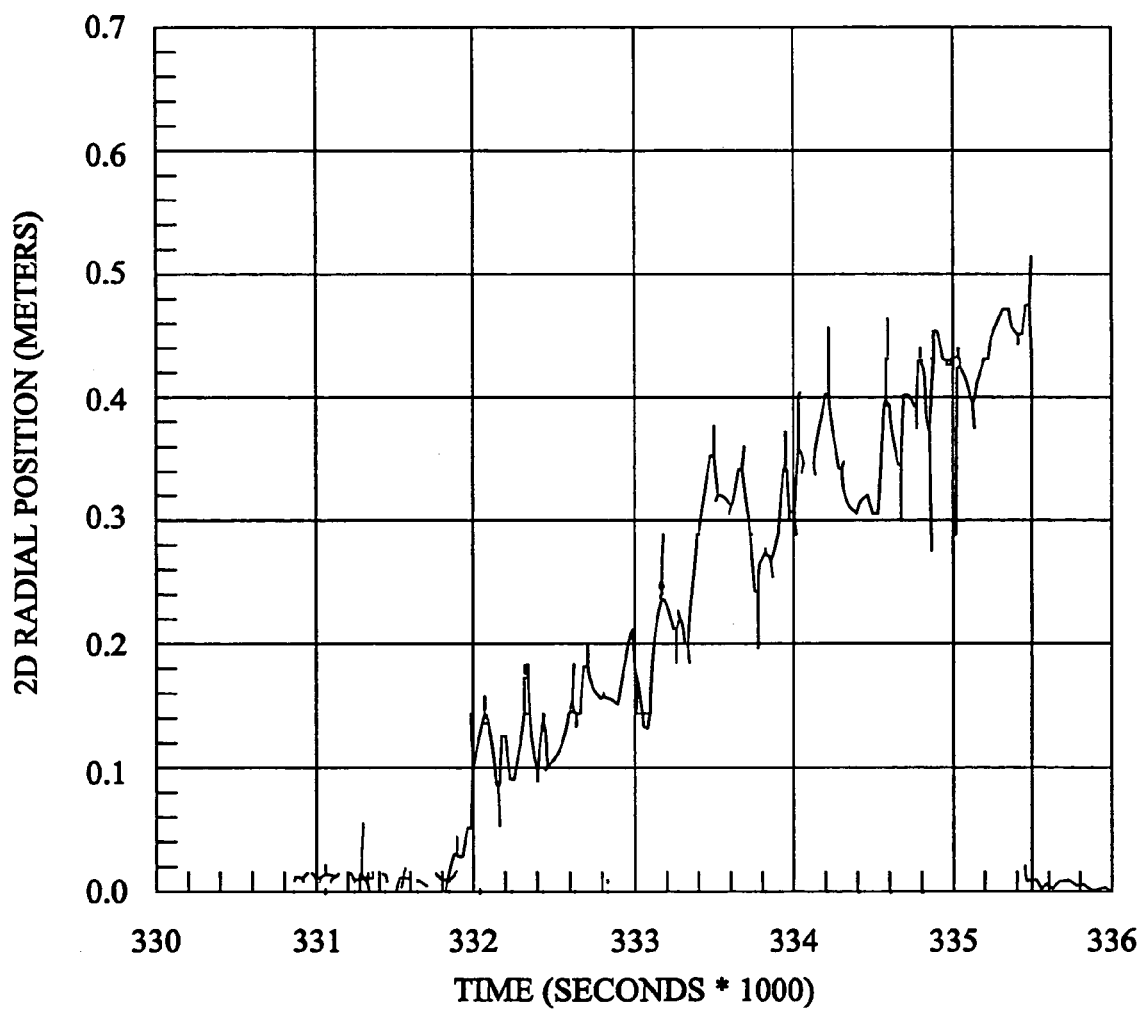
FIG. 4a is a graph of real-time position error, the system using ZUPD's each minute to aid the AINS between position fixes.
Figure 4B:
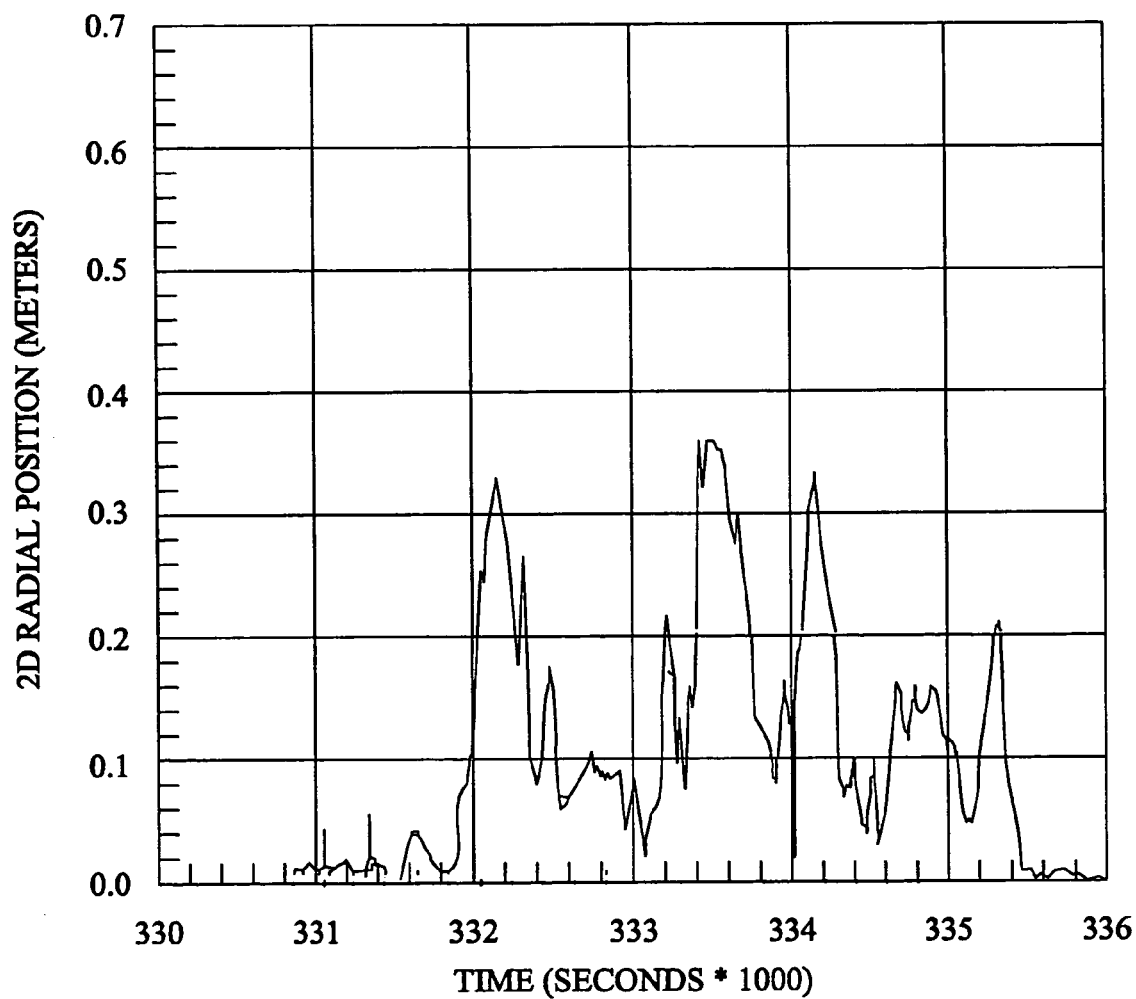
FIG. 4b is a graph of real-time position error, the system using ZUPD's each minute to aid the AINS between position fixes, the positions being reprocessed.

FIG. 4a shows a plot of real-time radial position error data as a function of time in thousands of seconds. FIG. 4b shows a plot of the reprocessed position error data as a function of time in thousands of seconds. ZUPD's were used to aid the AINS between position fixes. The reference position for computing the radial error was obtained from a precision GPS position solution with 0.05 meter accuracy.

A Position Fix

A "position fix started" condition is determined when the operator directs the AINS-LSSRP to perform a position fix/ZUPD at a pre-surveyed location. The system is stationary at the time; therefore, a position fix is a combination of position fix and a ZUPD. The operator enters the position coordinates using the input/output interface device 48, typically a handheld screen/keyboard.

As an alternative, a precise GPS calculated position is transferred via a link such as an infrared or optical, acoustic or electrical link in place of an operator manually entered position to avoid errors and reduce the operator workload. As presently conceived, a manual action from the operator initiates or triggers the transfer of a position fix from the GPS to the system at the location of a tie-down. As an alternative embodiment, the GPS position is used in place of the manually entered position to avoid operator-induced errors.

Figure 5:
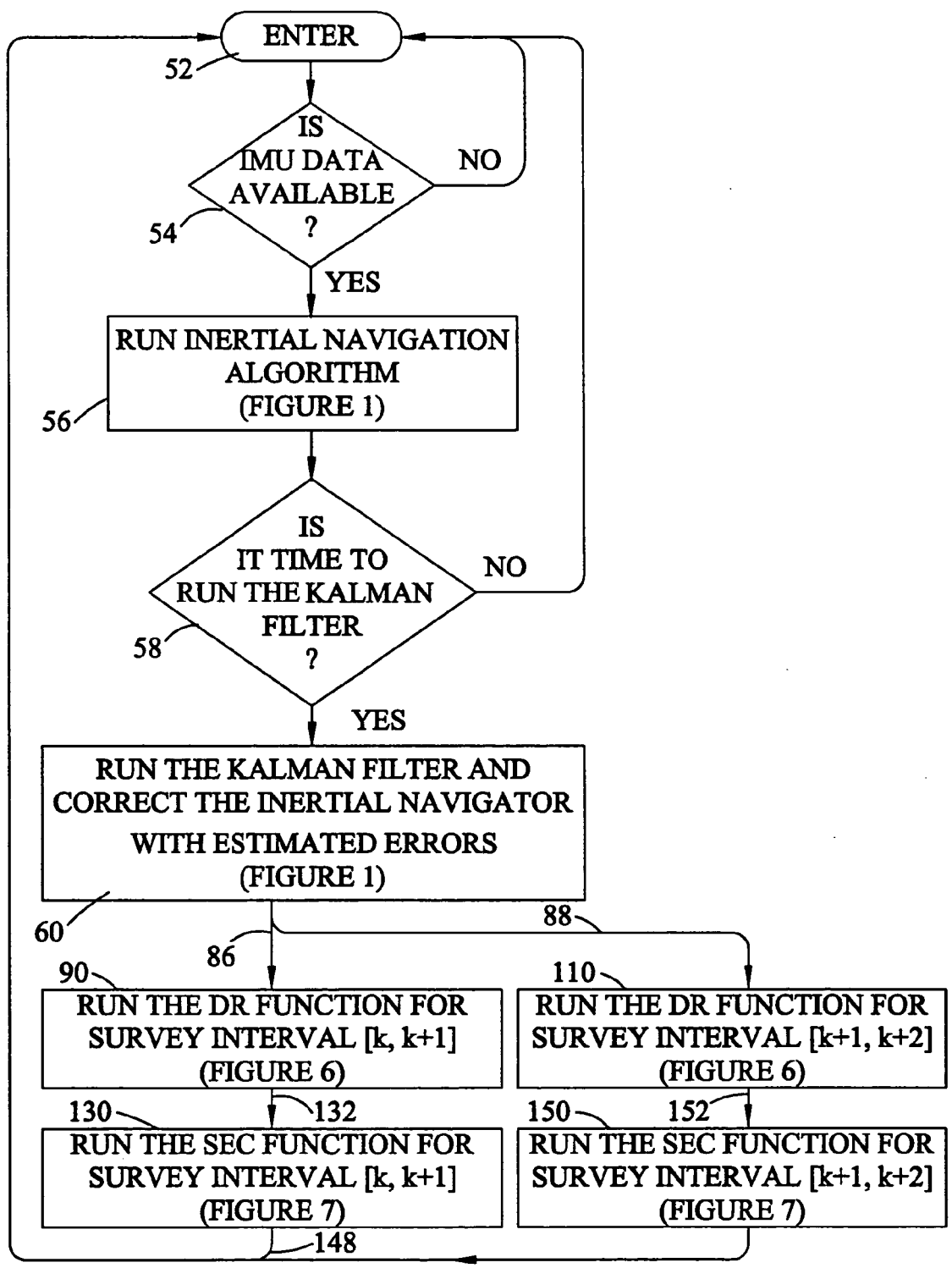
FIG. 5 is a flow chart for a computer program for storing time position values as the system moves between position fixes and for reprocessing the real-time position values at the end of a position fix.

Blocks 52–60 of FIG. 5 shows the steps performed by the generic AINS 26, described schematically in FIG. 1. The steps begin at ENTER block 52. The AINS 26 receives IMU data such as accelerations and rotation rates via block 54 at the IMU sampling rate, of typically 50–500 Hz and occasionally as high as 1000 Hz. The inertial navigator algorithm 56, operates on the data, to update each IMU record and to provide a time-indexed INS navigation solution.

The decision 58 to run the Kalman filter can be based on time or on availability of aiding values. If, for example, a GPS receiver nominally provides position information every 1 second, then AINS can run the Kalman filter every 1 second with the arrival of each batch of new GPS data. Alternatively, if only ZUPD's are available, the Kalman filter is run at the completion of each respective ZUPD.

At the conclusion of each cycle, or indexed computation, the Kalman Filter, represented by block 34 in FIG. 1, and the RUN THE KALMAN FILTER AND CORRECT THE INERTIAL NAVIGATOR WITH ESTIMATED ERRORS (FIG. 1) block 60 in FIG. 5, updates its estimate of the INS errors. The Kalman filter provides its estimate to the error controller block 35, on FIG. 1, that is used to send navigator correction signals to the Inertial Navigator 24.

FIG. 5 shows the RUN THE DR FUNCTION FOR SURVEY INTERVAL [k, k+1] (FIG. 6) block 90, and the RUN THE DR FUNCTION FOR SURVEY INTERVAL [k+1, k+2] (FIG. 6) block 110. FIG. 5 also shows the RUN THE SEC FUNCTION FOR SURVEY INTERVAL [k, k+1]. (FIG. 7) block 130 and the RUN THE SEC FUNCTION FOR SURVEY INTERVAL [k+1, k+2] (FIG. 7) block 150.

The DR and SEC Functions 90, 130 in FIG. 5 collectively describe the reprocessing function. The DR and SEC Functions run whenever the AINS-LSSRP Kalman filter 34 runs. The Kalman filter can process a single position fix measurement or a succession of measurements of the same position fix during a Position Fix (PF) interval during which the AINS-LSSRP is stationary at a known position. The Kalman filter will processes ZUPD measurements, precise pedometer or other aiding input measurements but not position measurements during a traverse interval. The AINS-LSSRP position error will drift at a specified rate. In processing a position fix during a PF interval after a traverse interval, the Kalman filter updates its estimate of AINS position error and reduces its position uncertainty from the accumulated position drift during the traverse interval to the uncertainty in the position fix, typically one the order of a few centimeters to a few decimeters depending on the accuracy of the surveyed position or of the precise GPS position information available.

Two pairs of blocks 90, 130 and 110, 150 depict two successive PF intervals during which the Kalman filter processes a succession of measurements of a position fix. The first time traverse interval is identified as the [k, k+1] interval. The [k, k+1] interval starts when the AINS-LSSRP begins to be stationary at a known position and the Kalman filter begins to process measurements every n-th second (typically every one second) of the known position. The Kalman filter also processes other measurements such as ZUPD measurements or pedometer measurements if these are enabled as part of the AINS-LSSRP. The [k, k+1] interval ends when the AINS-LSSRP begins to move and the Kalman filter stops processing position fix measurements. Interval [k, k+1] can describe a single Kalman filter position fix measurement, in which case the [k, k+1] interval starts and ends at the same time, or a succession of measurements, in which case the interval [k, k+1] starts and ends at different times. The survey interval [k, k+1] in DR Function 90 and SEC Function 130 FIG. 5 extends from the start of interval [k, k+1] at sample "k" to the end of the [k, k+1] interval at sample "k+1". Likewise, the survey interval [k+1, k+2] in the DR Function 110 and SEC Function 150 in FIG. 5 extends from the start of interval [k+1, k+2] to the end of interval [k+1, k+2]. The survey intervals [k, k+1] and [k+1, k+2] will overlap at the end of the [k, k+1] interval.

Therefore, FIG. 5 shows two parallel DR and SEC function boxes to indicate the possible concurrent execution of two DR and SEC functions for survey intervals [k, k+1] and [k+1, k+2]. Each pair of processes, a DR process followed by a respective SEC process, is therefore a generic process, each pair being started by a host process for a given survey interval and then terminated when their operation is ended.

In the alternative, each pair could be the functional object of a generic class that is initialized and executed for the survey interval [k, k+1] or [k+1, k+2] assigned to them, and then re-initialize for the next survey interval [k+3, k+4] or [k+4, k+5] assigned to them.

The DR Function

Figure 6:
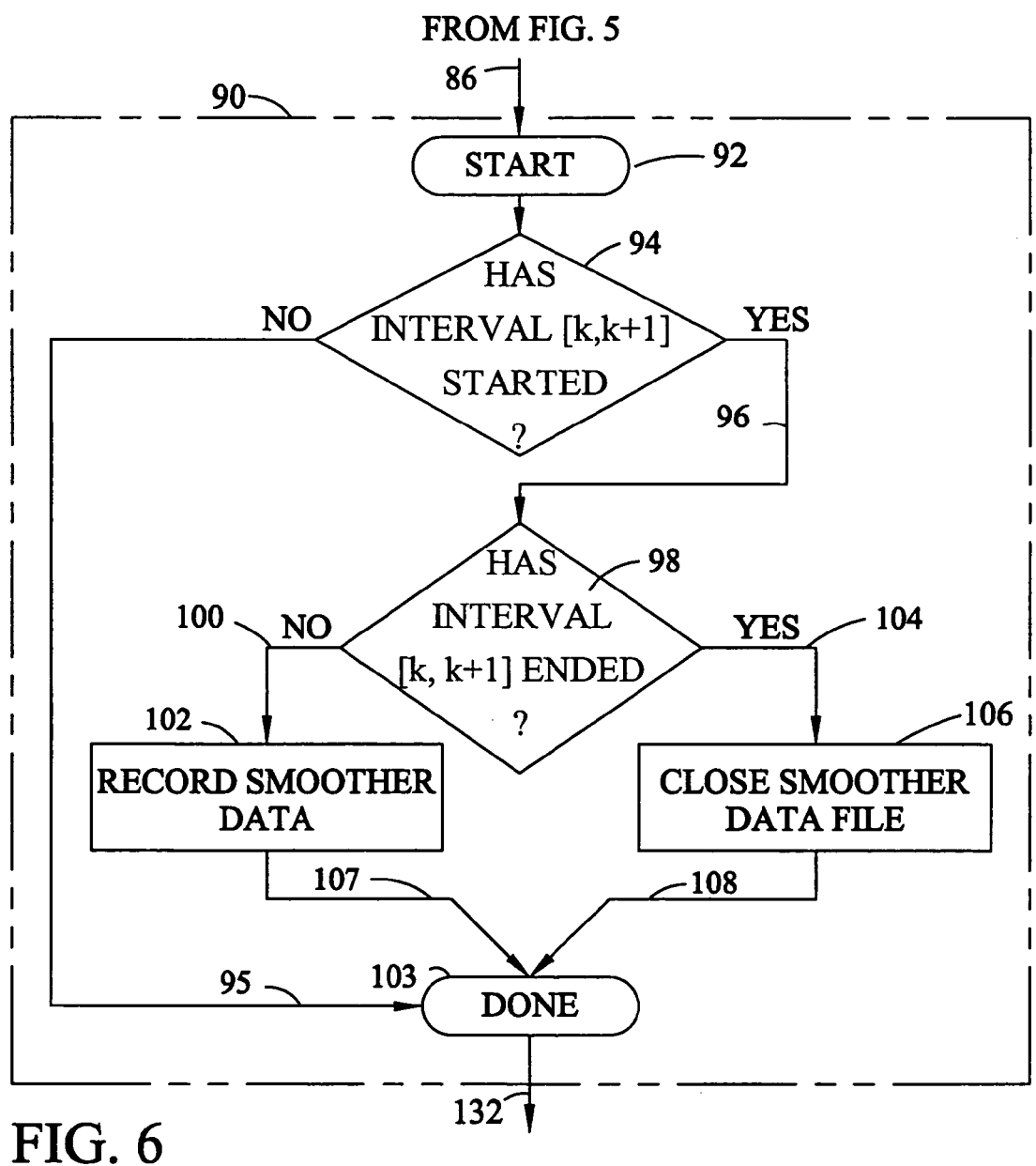
FIG. 6 is a flow chart for signaling the start of recording smoother data at the beginning of a survey interval and for subsequently closing the smoother data file at the end of the survey interval.
Figure 7:
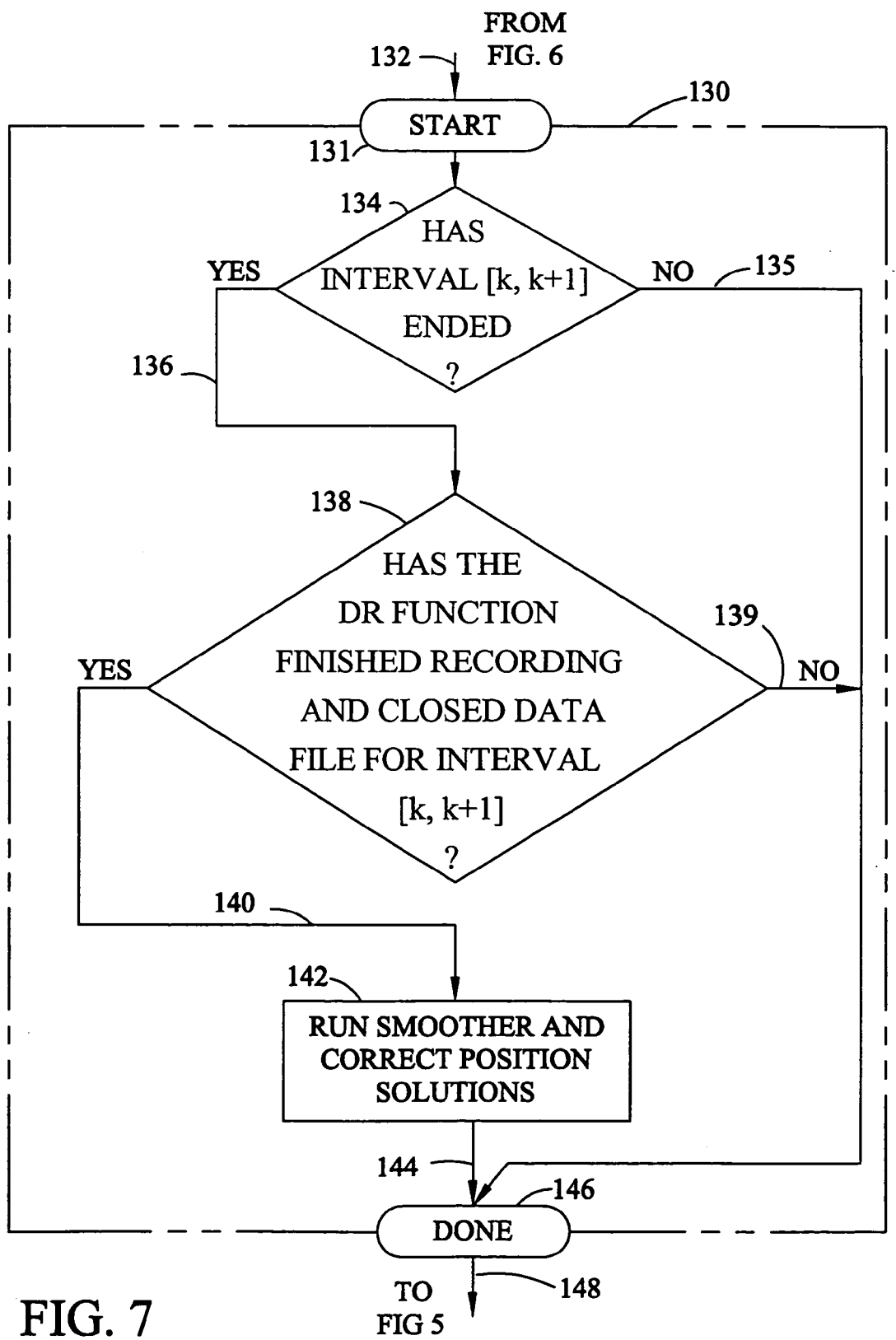
FIG. 7 is a flow chart for signaling the start of running the smoother filter at the end of the previous survey interval.

FIG. 6 shows the DR function for the survey interval [k, k+1]. The sub-routine of FIG. 6 begins when the sub-routine exits block 60 via signal path 86 on FIG. 5 and enters FIG. 6 at START block 92 after which it advances to HAS INTERVAL [k, k+1] STARTED, decision box 94. If decision box 94 determines that the traverse for interval [k, k+1] has started, the routine exits decision box 94 via YES path 96 to the HAS INTERVAL [k, k+1] ENDED decision box 98. If the routine determines that the survey interval [k, k+1] has not ended, exits via the NO path 100 to the RECORD SMOOTHER DATA box 102. The DR Function routine then records the time-present position values to a smoother data file in a set of smoother data files that it open on first pass through box 102. The routine continues to record smoother values exiting box 102 to the DONE box 103 on each subsequent pass until the HAS INTERVAL [k, k+1] ENDED decision box 98 has determined that [k, k+1] has ended. On determining that interval [k, k+1] has ended, the routine exits decision box 98 via the YES path 104 to the CLOSE SMOOTHER DATA FILE box 106 at which time the routine closes the smoother files in the allocated memory. Each time the routine completes the task of blocks 102 or 106, the routine passes via paths 107 or 108 respectively to the DONE block 103, after which it follows path 132 in FIG. 5 to the RUN THE SEC FUNCTION FOR SURVEY INTERVAL [k, k+1] (FIG. 7) block 130. FIG. 7 shows the steps in the SEC routine of block 130. The routine is entered via signal path 132 to start block 131. Thereafter the DR function of block 90 for the survey interval [k, k+1] ceases to be active.

The DR function thus records smoother values from the start to the end of interval [k, k+1]. This set of smoother files is then applicable to the survey interval [k, k+1]. Each successive DR function generates a set of smoother files for each successive survey interval.

Typically survey intervals are defined between sequential start and end position fixes (i.e., one after the other), but can be defined to include other position fixes between them. The DR function generates files of values to be reprocessed, containing the navigation values to be corrected and the AINS Kalman filter values required by the smoother algorithm. The DR function generates one file or set of files for each survey interval to be reprocessed.

As the operator enables reprocessing, the DR function writes the values required by the smoother to a smoother data file or set of files on the mass storage memory 46 beginning at a starting position fix interval PF1 and ending at an end position fix interval PF2 for a given survey interval. The DR function determines the time to start and stop recording when the operator directs the AINS-LSSRP to enter positions at PF1 and PF2 via the input/output interface device 48. At PF1, the DR function opens the smoother data file(s) and begins recording subject to the AINS-LSSRP confirming that it is at rest. Data continues to be recorded as the AINS-LSSRP moves to the next position fix at PF2 where the operator brings the AINS-LSSRP to rest and provides a PF2 signal. The DR function closes the smoother data file(s) when the AINS-LSSRP begins to move again. The SEC function then runs the smoother on the recorded values and computes smoothed navigation solutions. The navigation solutions can be for the stake or control positions, or for a timed series of values during the survey segment.

As the AINS-LSSRP continues to move, the DR function continues to write values required by the MBFS to the next smoother data file on the mass storage memory 46 beginning at a starting position fix PF1 and ending at an end position fix PF2. The DR function determines the time to start and stop recording when the operator directs the AINS-LSSRP to enter positions at PF1 and PF2 via the interface device 48. As before, at the end of the PF2 interval, the DR function closes smoother values file.

The SEC Function

FIG. 7 shows the SEC function for the survey interval [k, k+1]. The sub-routine of FIG. 7 begins on FIG. 5 or FIG. 6 when the sub-routine exits block 90 via signal path 132 and enters FIG. 7 at START block 131 after which it advances to the HAS INTERVAL [k, k+1] ENDED? decision box 134. The test for this determination can involve a manual signal from the surveyor or an evaluation of velocity or position signals to determine if the package has again started moving. The SEC Function for the survey interval [k, k+1] will run concurrently with the DR Function for the survey interval [k+1, k+2]. The exceptions are the first and last position fixes in a survey job. The SEC Function tests for the end of an interval [k, k+1] during which position fixes are processed. If the decision box 134 determines that the interval [k, k+1] is not ended, i.e., the DR function continues to record time-indexed position values as the traverse continues, and the SEC Function routine advances via NO path 135 to the DONE box 146 and then via signal path 148 to ENTER box 52 on FIG. 5.

If the decision box 134 determines that the [k, k+1] interval is ended, the SEC Function routine advances via YES path 136 to the HAS THE DR FUNCTION FINISHED RECORDING AND CLOSED DATA FILE FOR INTERVAL [k, k+1]? decision block 138 to determine if the DR Function has recorded a complete set of smoother values for the survey interval [k, k+1].

If the data set is not complete, the SEC Function routine advances via the NO path 139 to the DONE box 146, exiting the DONE box via signal path 148 to FIG. 5 to ENTER box 52 for another iteration.

If the data set exists and is complete, the SEC Function exits decision box 138 via the YES signal path 140 to the RUN SMOOTHER AND CORRECT POSITION SOLUTIONS box 142. Box 142 functions to launch the smoother, which processes the data set and computes a set of smoothed navigation solutions for the [k, k+1] survey interval. The smoothing and error correction (SEC) function of box 142 run a smoothing algorithm, such as the MBFS of equations 12–17 on the smoother data file to compute smoothed estimates of position error in the real-time position solutions. The smoother then corrects the real-time position solutions to obtain smoothed position solutions with better accuracy than the real-time position solutions.

The smoothed navigation solution has the best achievable accuracy with the values recorded during the survey interval, and hence is called the best estimate of trajectory (BET). When the smoother has completed processing the smoother values, the SEC Function routine for the survey interval [k, k+1] exits via signal path 144 to the DONE box 146. The routine exits the DONE box via signal path 148 to FIG. 5 to ENTER box 52 for another iteration. On exiting box 146, the SEC Function for the traverse of interval [k, k+1] increments the index counter for the next traverse and the [k+1, k+2] interval. After exiting block 130, the SEC function for interval [k, k+1] ceases to be active.

As the SEC Function routine completes the SEC computation of the time-indexed position value data stored during the traverse of interval [k, k+1], all files required by the SEC for this survey interval can be deleted to limit the growth of data storage space. In principal, this function is not required if data storage space is unconstrained or otherwise not an issue.

On the next pass, the subroutine operates the same performing the same steps on FIG. 5 from box 52 through box 60. As a result of the index counters being incremented from "k" to "k+1" and "k+1" to "k+2", the next traverse leaves block 60 via path 88 and starts the next traverse with the RUN THE DR FUNCTION FOR SURVEY INTERVAL [k+1, k+2] (FIG. 6), box 110. The jump to box 110 marks the start of the next or subsequent pair of DR, SEC Functions. The functions of block 110, path 152 and block 150 are identical in operation to those of blocks 90, path 132 and block 130 discussed above. The routine then operates through the next traverse and again increments the PF index registers.

The SEC function can operate concurrently with the DR function to process the file or set of files most recently generated by the DR function. The SEC function will for example reprocess the values from the last survey interval files while the DR function records values during the current survey interval.

While the invention has been explained in connection with several embodiments, it is intended that the appended claims be used to limit the scope of this patent.

What is claimed is:

1. A Land Surveyor System with Reprocessing (LSSRP) comprising:
   an Aided Inertial Navigation System (AINS) providing a sequence of time-indexed present position values in response to the LSSRP being moved from a first known position value at the start of a survey interval to a second known position value at the end of the survey interval,
   a Position Computing System (PCS) coupled to receive and store the sequence of time-indexed present position values as a surveyor carries the LSSRP from the first known position to the second known position,
   the PCS and the AINS being integrally coupled into a package, the package further comprising:
   a means for inputting and time-indexing successive first and second known present position values at respective successive known present position fixes, each successive pair of known present position values establishing the beginning and end of a survey interval,
   the PCS having a reprocessing computer and program means coupled to receive and store the successive time-indexed known present position fix values for processing the indexed present position values with a Modified Bryson-Frazier smoother (MBFS) algorithm to provide indexed and adjusted present position values for at least some of the indexed present position values between the first known position fix value at the start of the survey interval and the second known position fix value at the end of the survey interval.

2. The LSSRP of claim 1 wherein the AINS uses a Kalman filter responsive to at least two sources of aiding signals,
   the PCS having an aiding signal selector algorithm characterized to select the most accurate aiding signal for use by the Kalman filter from all available aiding signals.

3. The LSSRP of claim 1 wherein the means for inputting and time-indexing successive first and second known present position values at respective successive known present position fixes further comprises:
   an input/output interface device having a computer key pad and a read-out display electrically coupled to the PCS for inputting successive known present position values and for signaling the start of reprocessing after inputting each successive known present position value.

4. The LSSRP of claim 1 wherein the PCS coupled to receive and store the sequence of time-indexed present position values further comprises:
   a mass storage memory for storing the sequence of time-indexed present position values.

5. The LSSRP of claim 4 wherein the mass storage memory for storing the sequence of time-indexed present position values is linked to the reprocessing computer and program mean by a radio link.

6. The LSSRP of claim 1 further comprising:
   a switch means for signaling the AINS and the Kalman filter that the unit is stationary by use of an algorithm, running in the PCS reprocessing computer and program means, for deducing zero velocity from computed inertial velocity.

7. The LSSRP of claim 6 wherein
   the switch means is a manually operated switch with the surveyor manually signals the AINS that the unit is stationary.

8. The LSSRP of claim 6 wherein the switch means comprises:
   a mechanical closure coupled to the package and electrically coupled to the AINS to signal the AINS that the unit is stationary, the mechanical closure being transferred by operation of a lever or plunger contacting the ground.

9. The LSSRP of claim 1 wherein the reprocessing computer and program means smoothing algorithm is a modified Bryson-Frazier smoother (MBFS) mechanized using the following equations and definitions for steps and definitions:
   data available to the MBFS at iteration k from the AINS-LSSRP Kalman filter:
   $\Phi(k; k-1)$ transition matrix from iteration k−1 to iteration k,
   $H_k$ measurement matrix,
   $K_k$ Kalman gain,
   $S_k$ Kalman innovations covariance,
   $\xi_k$ innovations vector,
   $\bar{x}_k^-, \bar{x}_k^+$ Kalman estimated error state,
   $P_k^-, P_k^+$ Kalman generated estimation error VCV matrix,
   and where,
   the backwards extrapolation follows:

$$\bar{\lambda}_{k-1}^+ = \Phi^T(k; k-1)\bar{\lambda}_k^-, \qquad (12)$$

$$\Lambda_{k-1}^+ = \Phi^T(k; k-1)\Lambda_k^- \Phi(k; k-1), \qquad (13)$$

and the adjoint measurement update follows:

$$\bar{\lambda}_k^- = (I - H_k K_k)\bar{\lambda}_k^+ - H_k S_k^{-1}\xi_k, \qquad (14)$$

$$\Lambda_k^- = (I - H_k K_k)^T \Lambda_k^+ (I - H_k K_k) + H_k^T S_k H_k, \qquad (15)$$

and where:
   $\bar{\lambda}_k^-$ is the a priori adjoint state vector,
   $\Lambda_k^-$ is the a priori adjoint VCV matrix,
   $\bar{\lambda}_k^+$ is the a posteriori state vector, and
   $\Lambda_k^+$ is the a posteriori adjoint VCV matrix;

and where:
the smoothed state and estimation error VCV matrix is defined by:

$$\bar{x}_k^s = \bar{x}_k^- - P_k^- \bar{\lambda}_k^- = \bar{x}_k^+ - P_k^+ \bar{\lambda}_k^+, \quad (16)$$

$$P_k^s = P_k^-(I - \Lambda_k^- P_k^-) = P_k^+(I - \Lambda_k^+ P_k^+), \quad (17)$$

and where the smoothed state vector is defined by:

$$\bar{x}_k^s = \begin{bmatrix} \delta \bar{r}_s \\ \bar{x}_{remaining}^s \end{bmatrix} \quad (19)$$

where
$\delta \bar{r}_s$ is the smoothed estimate of AINS position error and $\bar{x}_{remaining}^s$ is the sub-vector of smoothed error states other than $\delta \bar{r}_s$ and where the AINS position vector $\bar{r}_{s_k}^e$ is obtained from the error correction difference matrix (20) using earth fixed Cartesian coordinates (X, Y, Z components) as $$\bar{r}_{s_k}^e = \bar{r}_k^e - \delta \bar{r}_s = \begin{bmatrix} \hat{r}_x^e - \delta \hat{r}_{s_x}^e \\ \hat{r}_y^e - \delta \hat{r}_{s_y}^e \\ \hat{r}_z^e - \delta \hat{r}_{s_z}^e \end{bmatrix}. \quad (20)$$

10. A Land Surveyor System with Reprocessing (LSSRP) transported by a surveyor moving from a first known position at the start of a survey interval to a second known position at the end of the survey interval, the LSSRP comprising:
an Aided Inertial Navigation System (AINS) having a Kalman filter coupled to be responsive to at least a first source of aiding time-indexed values, the AINS providing a continuing sequence of time-indexed present position values,
a Position Computing System (PCS) having a program for storing the continuing sequence of time-indexed present position values in a memory,
the PCS further comprising a reprocessing computer and program means activated at the second known position to access and process the stored continuing sequence of time-indexed present position values with an optimal smoothing program to provide indexed and adjusted present position values for at least some of the continuing sequence of time-indexed present position values.

11. The Land Surveyor System with Reprocessing (LSSRP) of claim 10 wherein:
the PCS and the AINS are integrally coupled into a package carried by and used by a surveyor, the package further comprising:
an input/output interface device having a means for inputting and time-indexing the known present position values at respective successive known present position fixes, each successive pair of known present position values establishing the beginning and end of a survey interval.

12. The Land Surveyor System with Reprocessing (LSSRP) of claim 10 wherein
the program for storing the continuing sequence of time-indexed present position values in a memory is further characterized to output the time-indexed present position values of the PCS as the surveyor moves from the first known position to the second known position, the surveyor using the output time-indexed present position value to locate at least one predetermined stake position.

13. The LSSRP of claim 10 wherein
the PCS further comprises an aiding signal selector for analyzing the aiding position signals available to the AINS and for commanding the AINS to select and use the highest accuracy aiding position signal available.

14. The LSSRP of claim 13 wherein
the aiding signal selector for analyzing the aiding position signals available to the AINS monitors for loss of differential Global Position Satellite (GPS) and directs the AINS to not use differential GPS signals as aiding position signals until differential GPS is restored.

15. The LSSRP of claim 13 wherein
the aiding signal selector is further characterized to receive all aiding position signals and to select and provide the highest accuracy aiding position signal to the AINS for use as an input to the Kalman filter.

16. The LSSRP of claim 10 wherein the PCS further comprises:
a mass storage memory for storing the sequence of time-indexed present position values in an array of memory locations for later recall.

17. The LSSRP of claim 10 wherein the PCS and AINS package further comprises a switch means for signaling that the AINS that the unit is stationary.

18. The LSSRP of claim 10 further comprising:
a switch means for signaling the AINS and the Kalman filter that the unit is stationary by use of an algorithm, running in the PCS reprocessing computer and program means, for deducing zero velocity from computed inertial velocity.

19. The LSSRP of claim 17 wherein
the switch means is further characterized to be coupled to the package and electrically coupled to the AINS and to automatically signal the start of a Zero-velocity Update (ZUPD) on contact with the ground.

20. A Land Surveyor System with Reprocessing (LSSRP) to be carried or transported by a surveyor along a predetermined path or a zigzag pattern of parallel seismic lines to locate and record the position fixes of stakes that the surveyor positions in accordance with a pre-planned grid of predetermined locations comprising:
an AINS programmed to provide a sequence of time-indexed present position values in response to the LSSRP being moved from a first known position fix location or "tie-down" at the start of a survey interval to a second known position fix location or "tie-down" at the end of the survey interval,
a reprocessing computer running a reprocessing program to process the indexed present position values with a Modified Bryson-Frazier smoother (MBFS), the reprocessing computer and smoothing algorithm calculating and storing smoothed and corrected indexed and adjusted present position values at the end of each survey interval, the resulting smoothed and corrected indexed and adjusted present position values being used to correct the position value or fix location of at least one stake positioned between the first known position fix location at the start of the survey interval and the second known position fix location at the end of the survey interval.

21. The Land Surveyor System with Reprocessing (LSSRP) of claim 20 further comprising:
- a Position Computing System (PCS) coupled to the AINS to receive and store the sequence of time-indexed present position values from the AINS as the surveyor moves the Land Surveyor System with Reprocessing (LSSRP) from the first known position fix location to the second known position fix location, the PCS and the AINS being integrally coupled into
- a package, the package being carried by the surveyor, the package further comprising:
- an input/output interface device having a means for inputting successive known present position fix location values at respective successive known present position fix locations, each successive pair of known present position values establishing the beginning and the end of a survey interval.

22. The Surveyor System with Reprocessing (LSSRP) of claim 21 further comprising
- a switch means coupled to the PCS for signaling that the package is stationary.

23. The Surveyor System with Reprocessing (LSSRP) of claim 22 wherein the switch means comprises an algorithm running in the AINS and or the PCS for automatically signaling when the package is stationary.

24. The Surveyor System with Reprocessing (LSSRP) of claim 22 further comprising:
- an aiding signal selector means coupled to at least two sources of aiding signals for analyzing the aiding position signals available for use by a Kalman filter and for automatically selecting the most accurate aiding signal for use by the Kalman filter from all available aiding signals.

* * * * *